(12) United States Patent
Okada et al.

(10) Patent No.: US 7,558,319 B2
(45) Date of Patent: Jul. 7, 2009

(54) METHOD AND APPARATUS FOR REPRODUCING IMAGES, AND IMAGE RECORDING APPARATUS

(75) Inventors: Shigeyuki Okada, Ogaki (JP); Hideki Yamauchi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 684 days.

(21) Appl. No.: 10/459,617

(22) Filed: Jun. 12, 2003

(65) Prior Publication Data
US 2004/0008770 A1 Jan. 15, 2004

(30) Foreign Application Priority Data
Jun. 13, 2002 (JP) ............... 2002-173316

(51) Int. Cl.
H04B 1/66 (2006.01)
(52) U.S. Cl. .................... 375/240.01; 375/240.24; 375/240.25; 375/240.02; 382/233; 382/235; 382/239; 382/232; 386/109; 386/33; 386/68; 386/40; 386/35; 386/112; 386/124
(58) Field of Classification Search ............ 375/240.01, 375/240.25, 240.02, 240.07, 240.26, 240.24; 382/233, 232, 235, 239; 386/68, 6, 7, 46, 386/109, 33, 40, 35, 112, 124
See application file for complete search history.

(56) References Cited

U.S. PATENT DOCUMENTS

| 5,864,646 A * | 1/1999 | Searby ................. 386/68 |
| 5,963,673 A * | 10/1999 | Kodama et al. ............ 382/239 |
| 6,754,274 B2 | 6/2004 | Park |
| 6,804,450 B1 * | 10/2004 | Kochale .................. 386/68 |

FOREIGN PATENT DOCUMENTS

| CN | 1158540 | 3/1997 |
| JP | 07-095536 | 4/1995 |

(Continued)

OTHER PUBLICATIONS

Office Action for corresponding Chinese application No. 03148635.5 along with English translation.

(Continued)

*Primary Examiner*—Shawn An
(74) *Attorney, Agent, or Firm*—McDermott Will & Emery LLP

(57) ABSTRACT

Structure information on picture within a GOP of a coded data sequence is acquired beforehand. At the time of high-speed reproduction, a high-speed reproduction mode judging unit judges by referring to the picture structure information whether a high-speed smooth reproduction is possible or not. If the high-speed reproduction is possible, a high-speed smooth reproduction control unit performs the high-speed smooth reproduction. If not possible, a high-speed skip reproduction control unit performs high-speed skip reproduction. For reverse reproduction, image data for one GPO, for example, are recoded by an MPEG encoder and then the recoded image data are stored in a storage. Then, a coded data amount predicted from the structure information on the picture within the GOP is compared with the capacity of the storage, and a countermeasure such as raising a compression ratio is taken if the estimated coded data amount exceeds the capacity of the storage.

3 Claims, 8 Drawing Sheets

FOREIGN PATENT DOCUMENTS

| | | |
|---|---|---|
| JP | 10-322661 | 12/1998 |
| JP | 2000-32395 | 1/2000 |
| JP | 2001103427 A * | 4/2001 |
| JP | 2001-177801 | 6/2001 |
| JP | 2001-320653 | 11/2001 |

OTHER PUBLICATIONS

Office action for corresponding Chinese Application No. 03148635.5 and English Translation thereof.

Office Action issued in corresponding Japanese Patent Application No. 2002-173316.

Japanese Notification of Reason(s) for Refusal, w/English translation thereof, issued in Japanese Patent Application No. JP 2006-040947 dated on Sep. 30, 2008.

Japanese Notification of Reason(s) for Refusal, w/English translation thereof, issued in Japanese Patent Application No. JP 2006-040946 dated on Sep. 30, 2008.

* cited by examiner

FIG.3A

PICTURE STRUCTURE
(DISPLAY SEQUENCE)
$I_1$ B B B P B B B P B B B P B B B $I_2$ B B B P B B B P B B B P B B B $I_3$ B B B P B B B P B B B P B B B
15 PICTURES

4X-SPEED REPRODUCTION
(CONVENTIONAL METHOD)
$I_1$ — — — $I_2$ — — — $I_3$ — — — $I_4$ — — —

4X-SPEED REPRODUCTION
(PRESENT METHOD)
$I_1$ — — — $I_2$ — — — $I_3$ — — — $I_4$ — — —

FIG.3B

PICTURE STRUCTURE
(DISPLAY SEQUENCE)
$I_1$ B B B P B B B P B B B $I_2$ B B B P B B B P B B B $I_3$ B B B P B B B P B B B
12 PICTURES

3X-SPEED REPRODUCTION
(CONVENTIONAL METHOD)
$I_1$ — — — $I_2$ — — — $I_3$ — — — $I_4$ — — —

4X-SPEED REPRODUCTION
(PRESENT METHOD)
$I_1$ — — — $I_2$ — — — $I_3$ — — $I_4$ — —

FIG.3C

PICTURE STRUCTURE
(DISPLAY SEQUENCE)
$I_1$ B B P B B P B B P B B P B B $I_2$ B P B B P B B P B B P B B $I_3$ B P B B P B B P B B P B B $I_4$ B P B B P B B P B B P B P
15 PICTURES  10 PICTURES  6 PICTURES  13 PICTURES

?X-SPEED REPRODUCTION
(CONVENTIONAL METHOD)
$I_1$ — — — $I_2$ — — — $I_3$ — — — $I_4$ — — —

4X-SPEED REPRODUCTION
(PRESENT METHOD)
$I_1$ — — $I_2$ — — $I_3$ — $I_4$ — —

FIG.4A

| PICTURE SEQUENCE | I | B | P | B | P | B | P | B | P | B | P | B | P | I | B | P | B | P | B ... |
|---|---|---|---|---|---|---|---|---|---|---|---|---|---|---|---|---|---|---|---|
| DISPLAY SEQUENCE | 1 | 2 | 3 | 4 | 5 | 6 | 7 | 8 | 9 | 10 | 11 | 12 | 13 | 14 | 15 | | | | |
| CODE SEQUENCE | 1 | 3 | 2 | 5 | 4 | 7 | 6 | 9 | 8 | 11 | 10 | 13 | 12 | 15 | 14 | | | | |

FIG.4B — 2X-SPEED

| | | | | | | | | | | | | | | | |
|---|---|---|---|---|---|---|---|---|---|---|---|---|---|---|---|
| PICTURES TO BE DISPLAYED | O | — | O | — | O | — | O | — | O | — | O | — | O | — | O |
| PICTURES TO BE DECODED   | O | — | O | — | O | — | O | — | O | — | O | — | O | — | O |

FIG.4C — 3X-SPEED

| PICTURES TO BE DISPLAYED | O | — | — | O | — | — | O | — | — | O | — | — | O | — | — |
|---|---|---|---|---|---|---|---|---|---|---|---|---|---|---|---|
| PICTURES TO BE DECODED   | O | — | O | O | — | O | O | — | O | O | — | O | O | — | O |

FIG.4D — 4X-SPEED

| PICTURES TO BE DISPLAYED | O | — | — | — | O | — | — | — | O | — | — | — | O | — | — |
|---|---|---|---|---|---|---|---|---|---|---|---|---|---|---|---|
| PICTURES TO BE DECODED   | O | — | O | — | O | — | O | — | O | — | O | — | O | — | — |

FIG.4E — 5X-SPEED

| PICTURES TO BE DISPLAYED | O | — | — | — | — | O | — | — | — | — | O | — | — | — | — |
|---|---|---|---|---|---|---|---|---|---|---|---|---|---|---|---|
| PICTURES TO BE DECODED   | O | — | O | — | O | O | O | — | O | — | O | — | — | — | — |

METHOD AND APPARATUS FOR REPRODUCING IMAGES, AND IMAGE RECORDING APPARATUS

BACKGROUND OF THE INVENTION

1. Field of the Invention

The present invention relates to a technology for reproducing or recording images, and it particularly relates to method and apparatus for reproducing coded image data, image recording apparatus and to a data structure of moving image data that can be utilized for these method and apparatuses.

2. Description of the Related Art

The digitalization of TV broadcasting is advancing rapidly. The digital broadcasting has already begun in BS (Broadcast Satellite) broadcasts and CS (Communication Satellite) broadcasts, and the plan is set for the digitalization of ground wave broadcasts as well. In digital TV broadcasting, the use of MPEG-2 (Moving Picture Expert Group 2), which is an international standard for data compression and expansion, makes it possible not only to transmit and store information at high efficiency but also to transmit multiple channels by a single repeater. It is thus also expected to provide greater convenience to the users.

On the other hand, the widespread use of portable terminals in recent years is expected to create greater needs for coding systems with high data compression ratio. Accordingly, investigations are being conducted on the use of MPEG-4 coding methods that can transmit images compressed at low bit rates. In digital TV broadcasting from now on, it seems that MPEG-4 will be used along with MPEG-2 for the distribution of image information.

In MPEG, the compression technique called "inter-frame prediction" is employed in coding the moving image data. The inter-frame prediction is a technique such that data of a frame to be coded are predicted and compressed based on data of a coded frame that corresponds to that in the past or future of said frame. In the inter-frame prediction in MPEG, adopted are not only forward prediction that performs prediction based on frames in the past but also bidirectional prediction that performs prediction based on both past frames and future frames.

In MPEG-2, three types of pictures called I picture (Intra-Picture), P picture (Predictive-Picture) and B picture (Bidirectionally Predictive-Picture) are defined to realize this bidirectional prediction. An I picture is an image independently produced by an intra-frame coding processing, irrespective of past and future reproduced images, and can be decoded by data within its image. All of macroblocks within the I picture are produced by the intra-frame coding processing. A P picture is produced by an inter-frame forward coding processing using the prediction based on a past I or P picture. The macroblocks within the P picture include both an intra-frame coded macroblock and an inter-frame coded macroblock by forward prediction.

The B picture is produced by the inter-frame coding processing using the bidirectional prediction. In the bidirectional prediction, a B picture is produced by one of the following three predictions.

(1) Forward Prediction; prediction from a past I picture or P picture.
(2) Backward Prediction; prediction from a future I picture or P picture.
(3) Bidirectional Prediction; prediction from past and future I pictures or P pictures.

The macroblocks within the B picture contain an intra-frame coded macroblock and an inter-frame coded macroblock by a forward prediction, backward prediction or interpolation prediction.

In MPEG-4, a video object in time sequence is called VO (Video Object) and each image that constitutes the VO is called VOP (Video Object Plane). The VOP corresponds to the picture in MEPG-2. The following four types of VOPs are available depending on the prediction coding used.

(1) I-VOP; intra-frame coded VOP.
(2) P-VOP; inter-frame forward-prediction coded VOP.
(3) B-VOP; inter-frame bidirectional-prediction coded VOP.
(4) S-VOP; sprite VOP.

The first three VOPs, which are I-VOP, P-VOP and B-VOP, correspond to I picture, P picture and B picture in MPEG-2, respectively.

In MPEG, the coded image data are expressed as bit stream data having a hierarchical structure. Motion pictures handled in MPEG are constituted by, for example, 30 frames for a second. In MPEG-2, the frame generally corresponds to the picture. In MPEG-2, the collection of pictures is called GOP (Group Of Picture), so that the random access is possible in units of GOP. In order to carry out the random access, at least one I picture is required within the GOP. In MPEG-4, the collection of VOP is handled as GOV (Group of VOP).

Thus, when the coded data stream according to MPEG standard is decoded and reproduced, data are accessed in units of GOP or GOV. However, the number of pictures (or VOPS) contained in one GOP (or GOV) is not necessarily fixed. In MPEG-2, as a standard level there are usually 15-30 pixels per GOP whereas there are about 120 GOPs per GOV in MPEG-4. However, for example, when a scene changes exists, a GOP may be counted anew from the very picture where the scene change occurred, and so forth. Thereby, the structure of GOP may have been changed at the time of editing. Thus, the number, types or order of pictures contained in the GOP is not necessarily fixed even within a series of coded data streams. Since the bidirectional prediction is performed in MPEG, the appearance order of pictures differs from the actual display order in the coded data stream, so that a complicated decoding processing will be required. And in the case where the structure of pictures is irregular, the processing will further become complicated if special reproduction processing, such as high-speed reproduction and reverse reproduction, is to be performed in particular. This complexity causes to make it impossible to perform the appropriate processing as the case may be.

SUMMARY OF THE INVENTION

The present invention has been made in view of foregoing circumstances, and an object thereof is to improve a processing technique for high-speed reproduction or reverse reproduction of coded data sequences.

A preferred embodiment according to the present invention relates to an image reproducing method. This method includes decoding a coded data sequence that contains mixedly a first-format frame and a second-format frame, which differ in format from each other, wherein the decoding includes: acquiring the number of frames that exist between a first-format frame and another first-format frame to be displayed subsequently when a reproduction is performed by decoding the first-format frame only or the first-format frame and part of the second-format frame; and determining a displaying interval for the first-format frames, based on said number of frames and a speed of the reproduction.

The first-format frame may be of a format such that it can be decoded by coded data of said first-format frame whereas the second-format frame may be of a format such that it can be decoded by referring to coded data of other frame. More specifically, the first-format frame may be I picture in MPEG whereas the second-format frame maybe P picture or B picture in MPEG. Since I pictures can be decoded independently, a simple high-speed reproduction can be realized by skipping P and B pictures and reproducing I pictures only. As another example, the first-format frame may be of a format such that it can be decoded by referring to coded data of a frame within itself or in the past than the frame. More concretely, it may be I or P picture in MPEG. In this case, the second-format frame may be of a format such that it can be decoded by referring to frames before and after the frame. More specifically, it may be B picture in MPEG. As still another example, not only the first-format frame but also part of the second-format frame may be, further displayed so as to realize the high-speed reproduction. In any case, when frames to be displayed are selected, an interval of the frames in the coded data sequence is reflected upon the displaying interval, thus permitting a fairly natural high-speed reproduction. Here, as a unit of image, the "frame" includes a concept such as "field" and the like.

Another preferred embodiment according to the present invention relates also to an image reproducing method. This method includes decoding a coded data sequence that contains mixedly a first-format frame and a second-format frame, which differ in format from each other, wherein the decoding includes: acquiring, in the event of reproduction performed by thinning out and displaying frames according to a reproduction speed, the format and order of a frame that constitutes the coded data sequence to be reproduced, prior to the reproduction; determining a frame to be displayed, based on the format and order of the frame; and determining a frame to be decoded, based on the format and order of the frame and the thus determined frame to be displayed.

By acquiring beforehand the structure and composition of picture, which picture to be decode and which picture to be displayed can be made known. In other words, which pictures to be thinned out can be decided. Thus, whether a smooth high-speed reproduction is possible or not can be judged.

Still another preferred embodiment according to the present invention relates also to an image reproducing method. This method includes: generating image data for use with reverse reproduction by coding image data corresponding to a plurality of frames in a format such that the image data can be decoded in the reverse order of a normal displaying order; storing temporarily in a memory the image data for use with reverse reproduction; and reading out the image data for use with reverse reproduction from the memory so as to decode them when a reverse reproduction is requested, wherein, based on a capacity of the memory, a mode of coding is determined prior to the generating the image data for use with reverse reproduction.

MPEG employs a very complex scheme of inter-frame prediction, so that the reproduction cannot be started instantly when a reverse reproduction request is made. Thus, pictures for one GOP, for example, are stored in a reverse-reproducible format. And when a reverse reproduction is requested, the pictures stored are displayed first while a next GOP is prepared in the background. Then, it can be judged whether image data for use with reverse reproduction can be stored in a memory or not, by acquiring beforehand the picture structure of GOPS. If it is not possible to hold the image data in the memory, the coding mode will be changed to cope with this situation. Here, the coding mode may be defined as a concept that includes the number, format, order of frames to be coded, a compression ratio of coding and so forth.

Still another preferred embodiment according to the present invention relates to an image reproducing apparatus. This apparatus comprises: a decoder which decodes a coded data sequence that contains mixedly first-format and second-format frames each of whose format differs from the other, so as to generate image data; a reproduction control unit which performs reproduction in a manner such that only part of frames contained in the coded data sequence are decoded by the decoder and displayed in a display unit; and a structure information acquiring unit which acquires the number, format or order of frames, wherein the reproduction control unit controls the reproduction based on the number, format or order of frames.

The reproduction control unit may include a first control unit which decodes and display the first-format frame only so as to realize a first reproduction mode, and wherein the first control unit may acquire from the structure information acquiring unit the number of frames that exist between a first-format frame and another first-frame to be displayed subsequently, and may determine a displaying interval for the first-format frames, based on said number of frames and speed of the reproduction.

The coded data sequence may be coded in units of a group of frames that contain at least one first-format frame and at least one second-format frame, and the first control unit may acquire the number of frames belonging to the group of frames, and regard the thus acquired number of frames as the number of frames that exists between a first-format frame and another first-format frame to be displayed subsequently. The group of frames may be, for example, a GOP in MPEG-2 or a GOV in MPEG-4. In general, one GOP most probably contains one I picture, so that it is safe to estimate that the number of pictures in a GOP and the number of pictures between two consecutive I pictures are the same.

The reproduction control unit may include a second control unit which thins out and displays frames according to a reproduction speed so as to realize a second reproduction mode, and wherein the second control unit may acquire from the structure information acquiring unit the kind and order of a frame that constitutes the coded data sequence to be reproduced, and determine a frame to be displayed and a frame to be decoded, based on said kind and order of the frame.

The reproduction control unit may further include a judging unit which determines validity of the second reproduction mode based on capability of the decoder. When the second reproduction mode is judged impossible, the judging unit may switch to the first reproduction mode. Thus, even in the case where the reproduction speed is changed continuously, a seamless high-speed reproduction can be realized.

Still another preferred embodiment according to the present invention relates also to an image reproducing apparatus. This apparatus comprises: an encoder which generates image data for use with reverse reproduction by coding image data corresponding to a plurality of frames in a format such that the image data can be decoded in the reverse order of a normal displaying order; a storage which stores temporarily the image data for use with reverse reproduction; and a reverse-reproduction control unit which reads out the image data for use with reverse reproduction from the storage so as to reproduce them when a reverse reproduction is requested, wherein the reverse-reproduction control unit determines a mode of coding based on a capacity of said storage.

The coded data sequence may be coded in units of a group of frames that contain at least one first-format frame and at least one second-format frame, and the reverse-reproduction control unit may acquire a frame structure for the group of frames, estimate a data amount that will result from coding of the group of frames and compare the estimated data amount with the capacity of the storage, so that the reverse-reproduction control unit may determine the mode of coding. The coded data stored in the storage may be, for example, data equivalent to one GOP.

When the reverse-reproduction control unit judges that the data amount exceeds the capacity of the storage, frames in the group of frames may be thinned out or a compression ratio may be raised at the time of coding. Thereby, a predetermined amount of coded data, for example, for one GOP is securely kept in the storage.

By reading out information stored in a predetermined position of the coded data sequence, the structure information acquiring unit may acquire the number, format or order of frames contained in the coded data sequence. If a storage side and a reading side of the information share the common recognition, the position of information stored in the coded data sequence may be arbitrary.

Still another preferred embodiment according to the present invention relates to an image recording apparatus. This apparatus includes a structure information adding unit which adds information in a predetermined position of a coded data sequence which is coded in units of a group of frames that contain mixedly first-format and second-format frames each of whose format differs from the other, where the information to be added thereby indicates the number, format or order of frames contained in the group of frames. For example, the first-format frame may be of a format such that it can be decoded by coded data of said first-format frame whereas the second-format frame may be of a format such that it can be decoded by referring to coded data of other frame.

Still another preferred embodiment according to the present invention relates to a data structure of moving image data that represent moving images. This data structure includes: a coded data sequence in which the moving image data are coded in units of a group of frames that contain mixedly first-format and second-format frames each of whose format differs from the other; and information, stored in a predetermined position of the coded data sequence, which indicates the number, format or order of frames contained in the group of frames.

It is to be noted that any arbitrary combination of the above-described structural components and expressions changed between a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 3A, 3B and 3C illustrate a method for high-speed skip reproduction.

FIGS. 4A, 4B, 4C, 4D and 4E illustrate a method for high-speed smooth reproduction.

DETAILED DESCRIPTION OF THE INVENTION

The invention will now be described based on embodiments which do not intend to limit the scope of the present invention but exemplify the invention. All of the features and the combinations thereof described in the embodiments are not necessarily essential to the invention.

First Embodiment

The present embodiments describes a technology in which picture structure/composition information is stored beforehand in a predetermined position of a coded data sequence of moving images coded according to an MPEG method, and this picture structure information is acquired at the time of a reproduction and is then utilized to control various reproduction processings. MPEG methods are used here as an example in the present embodiments. However, the present embodiments is generally utilizable when handling a coded data sequence which has a mixed presence of frames coded by an intra-frame coding method and frames coded by an inter-frame coding method. Moreover, for the sake of brevity, terms such as pictures and GOP in MPEG-2 are used hereinbelow, but they are not limited thereto and include also a concept of VOP and GOV in MPEG-4.

Figure 1:
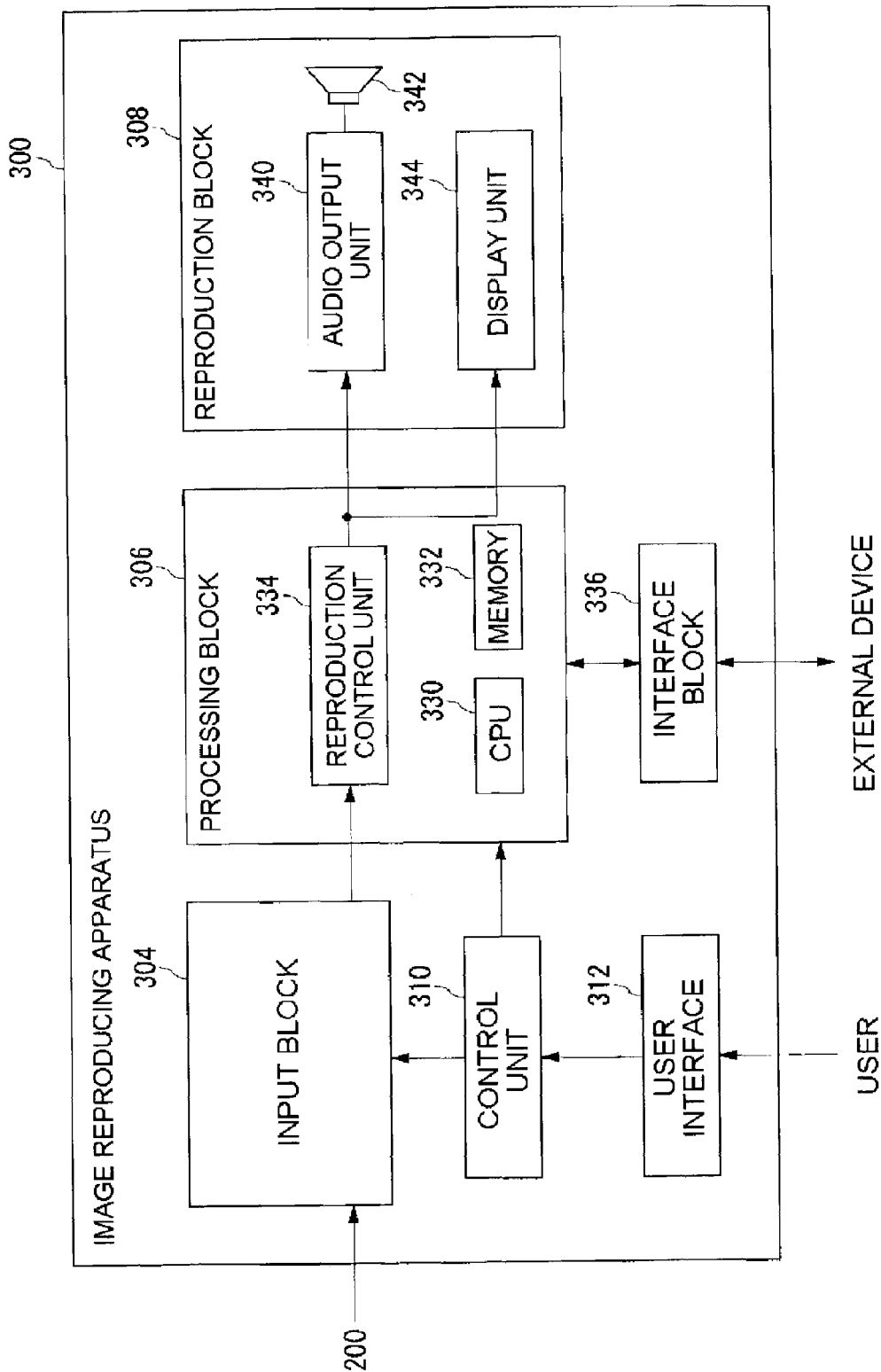
FIG. 1 is a block diagram showing a structure of an image reproducing apparatus according to a first embodiment of the present invention.

FIG. 1 is a block diagram showing a structure of an image reproducing apparatus 300 according to a first embodiment. This image reproducing apparatus 300 is built into a movie camera, still camera, television set, video CD reproduction apparatus, DVD reproduction apparatus or the like which outputs MPEG video streams from a transfer medium 200 to a display unit 344. The transfer media 200 include any of storage media such as video CD, CD-ROM, DVD, VTR and the like, a communication media such as LAN and the like, broadcast media such as ground wave broadcast, satellite broadcast, CATV and the like, and so forth. When data from such storage media or broadcast media are not coded according to an MPEG video part, the transfer media include an MPEG encoder that codes this digital data. In a case when the image reproducing apparatus 300 is built into the movie camera or still camera, the transfer medium 200 is replaced with an image pickup device, such as CCD, and a signal processing circuit therefor.

The image reproducing apparatus 300 includes: an input block 304 which inputs a coded data stream from the transfer medium 200; a processing block 306 which processes images and audio data acquired by the input block 304; a reproduction block 308 which reproduces images and audio decoded by the processing block 306; a user interface 312 which receives a user's instruction; and a control unit 310 which controls the input block 304 and the processing block 306, based on the instruction from the user interface 312. Moreover, an interface block 336 outputs the image data decoded by the processing block 306 to an external device as appropriate.

A reproduction control unit 334 in the processing block 306 is linked and affiliated to a CPU 330 and a memory 332, and decodes the image and audio data in the coded data stream. The reproduction control unit 334 decodes the inputted coded data stream, and outputs the audio data and the image data to an audio output unit 340 and a display unit 344, respectively. The audio output unit 340 performs a predetermined processing on the inputted audio data, and the thus processed audio data is finally outputted to a speaker 342. The display unit 344 displays the inputted image data.

The user interface 312 receives from a user a request of switching of reproduction speed, a reverse reproduction and so forth, via a remote controller, an input panel or the like. The control unit 310 sends a reproduction mode switching signal to the input block 304 and the processing block 306. Based on this switching signal, the reproduction control unit 334 performs a normal, high-speed or reverse reproduction.

Figure 2:
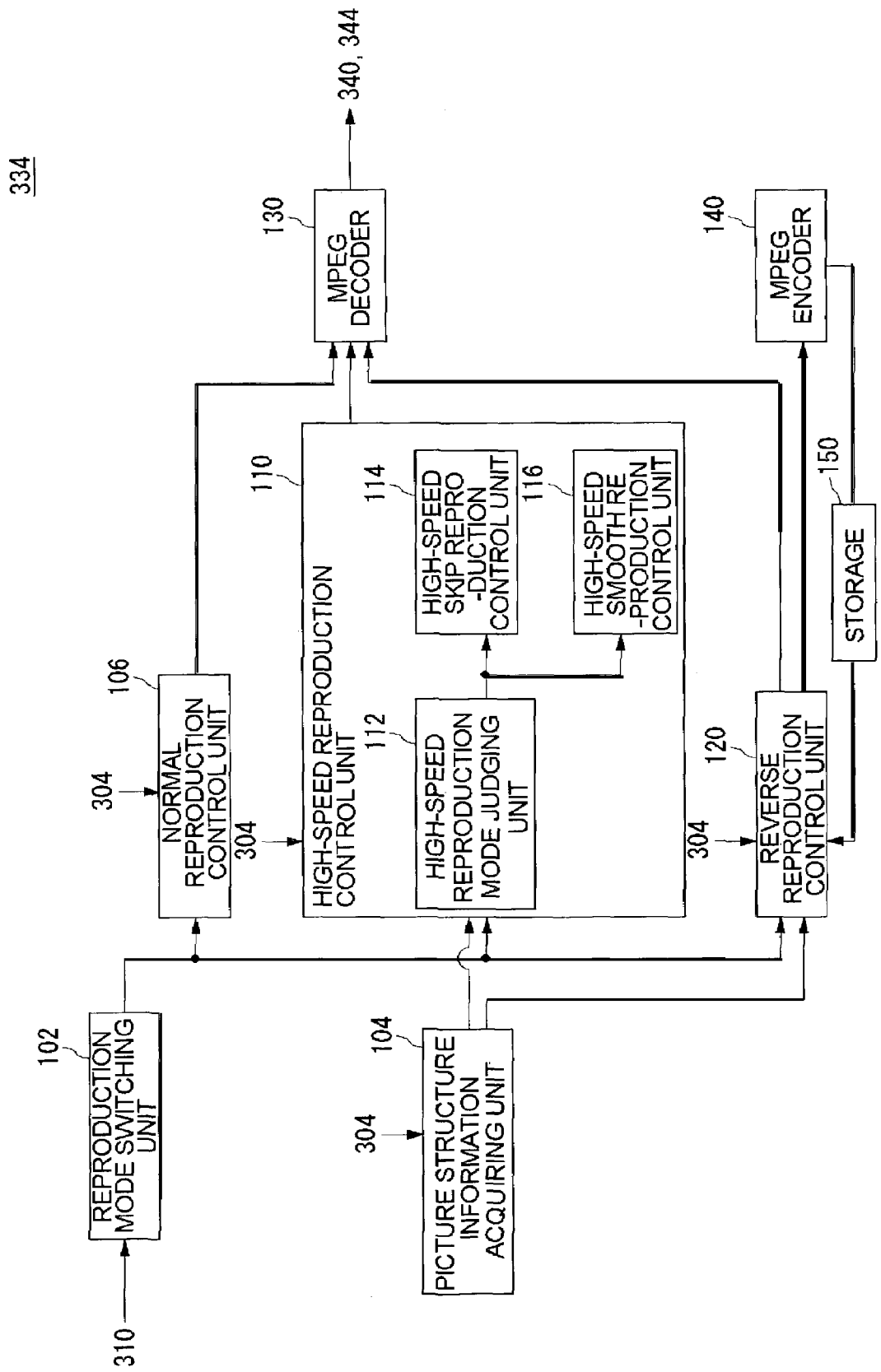
FIG. 2 is a diagram block showing a functional structure of a reproduction control unit shown in FIG. 1.

FIG. 2 is a diagram block showing a structure of the reproduction control unit 334. In terms of hardware, the above-described structure can be realized by a CPU, a memory and other LSIs. In terms of software, it can be realized by memory-loaded programs having image reproducing and controlling functions or the like, but drawn and described here are function blocks that are realized in cooperation with those. Thus, it is understood by those skilled in the art that these functional blocks can be realized in a variety of forms by hardware, only, software only or the combination thereof. A block or blocks which can be realized, in terms of hardware, among the blocks in the reproduction control unit 334 may be fabricated into a single-chip LSI.

A reproduction mode switching unit 102 receives reproduction mode switching signals from the control unit 310 and sends instructions on reproduction processing to a normal reproduction control unit 106, a high-speed reproduction control unit 110 and a reverse reproduction control unit 120. When the reproduction mode is for normal reproduction, the normal reproduction control unit 106 performs a control by which a coded data stream inputted from the input block 304 is inputted to and decoded by an MPEG decoder 130 and the resulting data stream is sent to and reproduced by the reproduction block 308. As the MPEG decoder 130, a conventionally known MPEG decoder may be used, but, as will be described hereinbelow, a double-speed decoder, a triple-speed decoder or the like that is capable of processing at higher speed than an ordinary MPEG decoder may also be used, thereby extending the processing limits of high-speed reproduction or reverse reproduction.

A picture structure information acquiring unit 104 acquires information on pictures that constitute a coded data stream. As will be described later, the picture structure information acquiring unit 104 acquires such information as the number, types and order of pictures that constitute one GOP, as picture structure information necessary for high-speed reproduction processing or reverse reproduction processing. Such information is stored beforehand in a predetermined position of the coded data stream, so that, by reading the data in the predetermined position, the picture structure information acquiring unit 104 can obtain information to be acquired.

The high-speed reproduction control unit 110 performs a control where a coded data stream is reproduced at higher speed than in normal reproduction mode when the reproduction mode is for high-speed reproduction. According to the first embodiment, two kinds of high-speed reproduction modes are available, namely, a "high-speed skip reproduction mode," where I pictures only are displayed in sequence by skipping all the P pictures and B pictures and a "high-speed smooth reproduction mode," where a high-speed reproduction is carried out smoothly by also using P pictures and B pictures. The high-speed reproduction mode judging unit 112 determines which of the modes to be used for high-speed reproduction based on the picture structure information acquired by the picture structure information acquiring unit 104 and the reproduction speed instructed by the user through the control unit 310. The judging method or a mode selection method will be described in detail later.

FIGS. 3A, 3B and 3C illustrate and explain a method for high-speed skip reproduction. The top row of FIG. 3A shows an example of a picture structure of a coded data stream. In this example, the picture structure is such that a GOP, which is constituted by 15 pictures, makes its appearance repeatedly. The middle row of FIG. 3A shows a display sequence of pictures when the coded data stream is subjected to a conventional quadruple-speed reproduction. In the conventional method, a quadruple-speed reproduction is realized by displaying I pictures in sequence at the rate of once every four frames. The bottom row of FIG. 3A shows a display sequence of pictures when the coded data stream is subjected to a quadruple-speed reproduction using the method of the present embodiment. In this method, too, I pictures only are displayed in sequence the same way as in the conventional system. Thus, high-speed reproduction can be realized in a simple and convenient manner.

The top row of FIG. 3B shows an example of a coded data stream in which a GOP comprised of 12 pictures makes its appearance repeatedly. The middle row of FIG. 3B shows a display sequence of pictures when the coded data stream is subjected to a conventional high-speed reproduction. In the conventional method, only I pictures are displayed in sequence as mentioned above, and the display interval thereof is fixed such that I pictures are displayed at the rate of once every four frames in the same manner as the example of the middle row of FIG. 3A. In this example, one GOP is constituted by 12 pictures and, as a natural result, a triple-speed reproduction is realized. That is, a triple-speed reproduction is performed not because it has been instructed by the user but simply because the I pictures have been displayed in sequence at fixed intervals. Therefore, the problem of the conventional system lies in that such a system displays I pictures at fixed intervals for high-speed reproduction and thus the reproduction speed cannot be controlled but varies depending on the picture structure within a coded data stream.

As another conspicuous case of such inconvenience, the top row of FIG. 3C shows an example in which the number of pictures constituting each of the GOPs varies within the same coded data stream. In this case, if a high-speed reproduction is performed on a conventional system as shown in FIG. 3B, the interval of I pictures will vary within the actual coded data stream and the I pictures will be displayed at fixed intervals without reflecting the variation of the intervals, thus giving the viewer an awkward impression resulting from the unnatural quickening and slowing of reproduction speed.

To solve problems like this, the present embodiment realizes natural high-speed reproduction reflecting the actual intervals of I pictures by using picture structure information acquired by the picture structure information acquiring unit 104. For example, when the coded data stream shown in the top row of FIG. 3B is put to a high-speed skip reproduction at quadruple-speed, it is previously known that each GOP is constituted by 12 pictures, so that a quadruple-speed reproduction can be realized by displaying the I pictures at the rate of once every three frames as shown in the bottom row of FIG. 3B. For triple-speed, the I pictures may be displayed every four frames, and for sextuple-speed, every two frames. For quintuple-speed, a control may, for instance, be used such that quadruple-speed (one picture every three frames) and sextuple-speed (one picture every two frames) are combined to produce a quintuple-speed on average or that the time for displaying one I picture lasts the length of time for 2.4 frames.

Moreover, as in an example shown in the top row of FIG. 3C, where the number of pictures constituting each of the GOPs varies, a high-speed skip reproduction reflecting the I picture intervals properly may be realized, as shown in the bottom row of FIG. 3C, by acquiring information on the pictures constituting the GOPs beforehand. To realize this above-mentioned method, it is necessary to know beforehand the intervals at which the I pictures appear. And where one I picture is contained in one GOP, it is possible to obtain or infer the intervals of I pictures by acquiring the numbers of pictures that constitute the GOPs. It goes without saying that the type and order of pictures constituting the GOPs may also be obtained.

FIGS. 4A, 4B, 4C, 4D and 4E illustrate and explain a method for high-speed smooth reproduction. The top row of FIG. 4A shows an example of a picture structure of a coded data stream. The middle and the bottom row of FIG. 4A show a display sequence and code sequence of this coded data stream, respectively. FIG. 4B shows pictures to be displayed and pictures to be decoded when a high-speed smooth reproduction at double-speed is performed on this coded data stream. For a double-speed reproduction, one picture may be displayed every two frames. In this example, the types of pictures to be displayed are $I_1P_3P_5P_7P_9P_{11}P_{13}P_{15}$ in this order. Here, "$I_1$", for instance, represents an "I" picture with its place "1" in the display sequence. The P pictures can be decoded provided the past I picture or P picture, which is a reference source, has been decoded, so that it is not necessary to decode the B pictures in between. Accordingly, the pictures to be decoded are $I_1P_3P_5P_7P_9P_{11}P_{13}P_{15}$ in this order. Since it suffices that one picture is decoded for one displayed picture, it is clear that this coded data stream can be high-speed-smooth-reproduced at double-speed by the use of an ordinary MPEG decoder.

FIG. 4C shows pictures to be displayed and pictures to be decoded when this coded data stream is high-speed-smooth-reproduced at triple-speed. For a triple-speed reproduction, one picture may be displayed every three frames, and the types of pictures to be displayed are $I_1B_4P_7B_{10}P_{13}$ in this order. To decode B pictures, it is necessary to decode the past and future I pictures or P pictures, which are reference sources, and therefore the pictures to be decoded are $[I_1]P_3P_5[B_4][P_7]P_9P_{11}[B_{10}][P_{13}]$ in this order. Here, the pictures to be displayed actually are shown in the bracket ([ ]). In this case, a high-speed smooth reproduction may be carried out by the use of a double-speed type MPEG decoder, which can decode two frames during a single frame period, though such cannot be accomplished by a single-speed MPEG decoder, whose decoding speed cannot catch up with the pictures.

FIG. 4D shows pictures to be displayed and pictures to be decoded when this coded data stream is high-speed-smooth-reproduced at quadruple-speed. For a quadruple-speed reproduction, the types of pictures to be displayed are $I_1P_5P_9P_{13}$ in this order, and to accomplish the display, $[I_1]P_3[P_5]P_7[P_9]P_{11}[P_{13}]$ need be decoded. That is, a high-speed smooth reproduction at quadruple-speed of this coded data stream can be carried out by the use of an MPEG decoder which can decode at double or higher speed.

FIG. 4E shows pictures to be displayed and pictures to be decoded when this coded data stream is high-speed-smooth-reproduced at quintuple-speed. For a quintuple-speed reproduction, the types of pictures to be displayed are $I_1B_6P_{11}$ in this order, and to produce the display, $[I_1]P_3P_5P_7[B_6]P_9[P_{11}]$ need be decoded. That is, a high-speed smooth reproduction at quintuple-speed can no longer be accomplished by a double-speed MPEG decoder, so that an MPEG decoder which can decode at triple or higher speed is needed.

In this manner, the speed of high-speed smooth reproduction is determined by the picture structure of a coded data stream and the performance of an MPEG decoder used. Now let the number of repeated appearances of a B picture be denoted by M, as an indicator of a picture structure. That is, when the picture structure is "IPPPPP . . . ," M=0 because none of B pictures is present; when the picture structure is "IBPBPBP . . . ," M=1 because one each of B pictures is inserted; and when the picture structure is "IBBPBBP . . . ," M=2 because two each of B pictures are inserted. Also let the number of frames that can be decoded within a single frame period be denoted by D, as an indicator of the performance of a decoder used. For example, D=2 when the decoder is a double-speed type, and D=3 when the decoder is a triple-speed type. In these cases, the limit speed L for high-speed smooth reproduction is expressed as L=(M+1)×D. When one each of B pictures is inserted as in the case of FIG. 4A, M=1, and therefore, for a single-speed type decoder, L=(1+1)×1=2, which means up to a double-speed high-speed smooth reproduction can be performed. For a double-speed type decoder, L=(1+1)×2=4, which means up to a quadruple-speed high-speed smooth reproduction can be performed.

Based on the criteria as mentioned above, the high-speed reproduction mode judging unit 112 may select high-speed smooth reproduction mode when a reproduction speed S specified by the user is less than or equal to L and may select high-speed skip reproduction mode when the reproduction speed S is greater than L, which renders high-speed smooth reproduction impossible. Moreover, when the picture structure is not fixed but varies for each GOP, the reproduction mode may be switched by judging the validity of high-speed smooth reproduction for each GOP, or high-speed skip reproduction mode may be selected. The same holds true for the case where, as in the above example, the picture structure within GOPs is irregular. Where judgment is difficult because of the irregularity of picture structure, the high-speed skip reproduction mode may be selected, or else a reproduction may be carried out in high-speed smooth reproduction mode and, at the point when the processing can no longer be continued, it may be switched to the high-speed skip reproduction mode.

As has been described above, a high-speed reproduction processing is controlled by acquiring information on the picture structure of a coded data stream beforehand. Thus, an appropriate reproduction method can be selected and a natural high-speed reproduction reflecting the picture structure of the coded data stream can be accomplished. Moreover, even when the apparatus is structured in such a manner as to allow the user to change the reproduction speed for analog-like, it is now possible to carry out the switching from high-speed smooth reproduction to high-speed skip reproduction seamlessly.

Referring back to FIG. 2, the reverse reproduction control unit 304 performs a control for reproducing the coded data stream in reverse sequence to normal reproduction mode when the reproduction mode is for reverse reproduction. In MPEG, where forward prediction and bidirectional prediction are used for coding and the code sequence and the display sequence of pictures differ from each other, decoding in reverse sequence is not easy compared with decoding in normal forward sequence. According to the first embodiment, in order to carry out a reverse reproduction smoothly, frames once decoded during normal reproduction are coded again by the MPEG encoder 140 and stored temporarily in the storage unit 150. To use the memory efficiently, the recoded data are overwritten one after another and the immediately previous GOP only is held in storage. At the time of encoding, all the pictures may be coded as I pictures, or the pictures may be rearranged into a reverse sequence and then coded by a normal MPEG system. The amount of data to be stored in the storage unit 150 may be one GOP, for instance.

When a reverse reproduction is requested by the user via the control unit 310, the reverse reproduction control unit 120 first reads out I pictures for one GOP stored in the storage 150 in reverse sequence, sends them to the MPEG decoder 130, and displays the decoded I pictures. In parallel with this, a past coded data stream is acquired by the input block 304, and the pictures generated by decoding, for instance, in units of one GOP are reproduced in reverse sequence.

Here, for example, when pictures for one GOP are coded and then stored in the storage 150, there may be cases where, in a coded data stream, the number, types and the like of pictures contained in the GOP are not constant, so that the number of pictures in a GOP may be larger than normal and thus may surpass the capacity of the storage 150. According to the present embodiment, therefore, a judgment is made as to whether or not the recoded data can be stored in the storage 150 by referring to the picture structure information acquired by the picture structure information acquiring unit 104. When it is judged that the recoded data cannot be stored therein, there may be remedial actions such as 1) the compression ratio is raised and the capacity per picture is reduced, 2) the pictures are thinned out and coded and, at reverse reproduction, the reproduction speed is regulated by continuously displaying the immediately previous frame at thinned-out frame positions, 3) the pictures are stored in the display sequence for reverse reproduction, and the ones that could not be stored are generated by decoding only after a request for reverse reproduction, 4) other memory regions are secured to raise the capacity of the storage 150, and 5) a decision is made that reverse reproduction is impossible and the user is notified and warned of the decision. These actions may make it possible to perform a reverse reproduction by acquiring a picture structure beforehand and using a memory efficiently even when the picture structure is irregular. Such an arrangement will also contribute to the reduction in memory size.

The picture structure information to be acquired by the picture structure information acquiring unit 104 is stored in a predetermined position of a coded data sequence. Such storage position may be a reserved region, namely, a user data region, provided in the GOP header or sequence header of the MPEG system, a position in an upper layer thereabove, or any position so long as it can be recognized by the picture structure information acquiring unit 104. The numbers of pictures contained in GOP may be calculated from a difference in "temporal_reference" code provided in the picture header of I pictures of MPEG-2 or from both the "time_code" information provided in the GOP header and the frame rate information provided in the sequence header.

The format of picture structure information may also be any format so long as it can be recognized by the picture structure information acquiring unit 104. For example, when the pictures constituting a certain GOP are "IBPBPB", "6", which represents the number of pictures in the GOP and, "132323", which expresses the picture types in a manner such that "I is denoted by 1 (I:1)", "P is denoted by 2 (P:2)" and "B is denoted by 3 (B:3)", may be stored in the user data region. Moreover, the order of pictures may be expressed by the number of B pictures inserted therein. In the above example, the number is "1" since one each of B pictures is inserted therein. Furthermore, a representative or typical sequence of pictures may be tabulated. In place of the number of pictures, temporal information on GOPs may be stored also.

So far, the structure of the image reproducing apparatus 300 according to the present embodiment has been described as above. An image reproducing procedure based on this structure according to the present embodiment will be described hereinbelow with reference to flowcharts shown in FIGS. 5 to 7.

Figure 5:
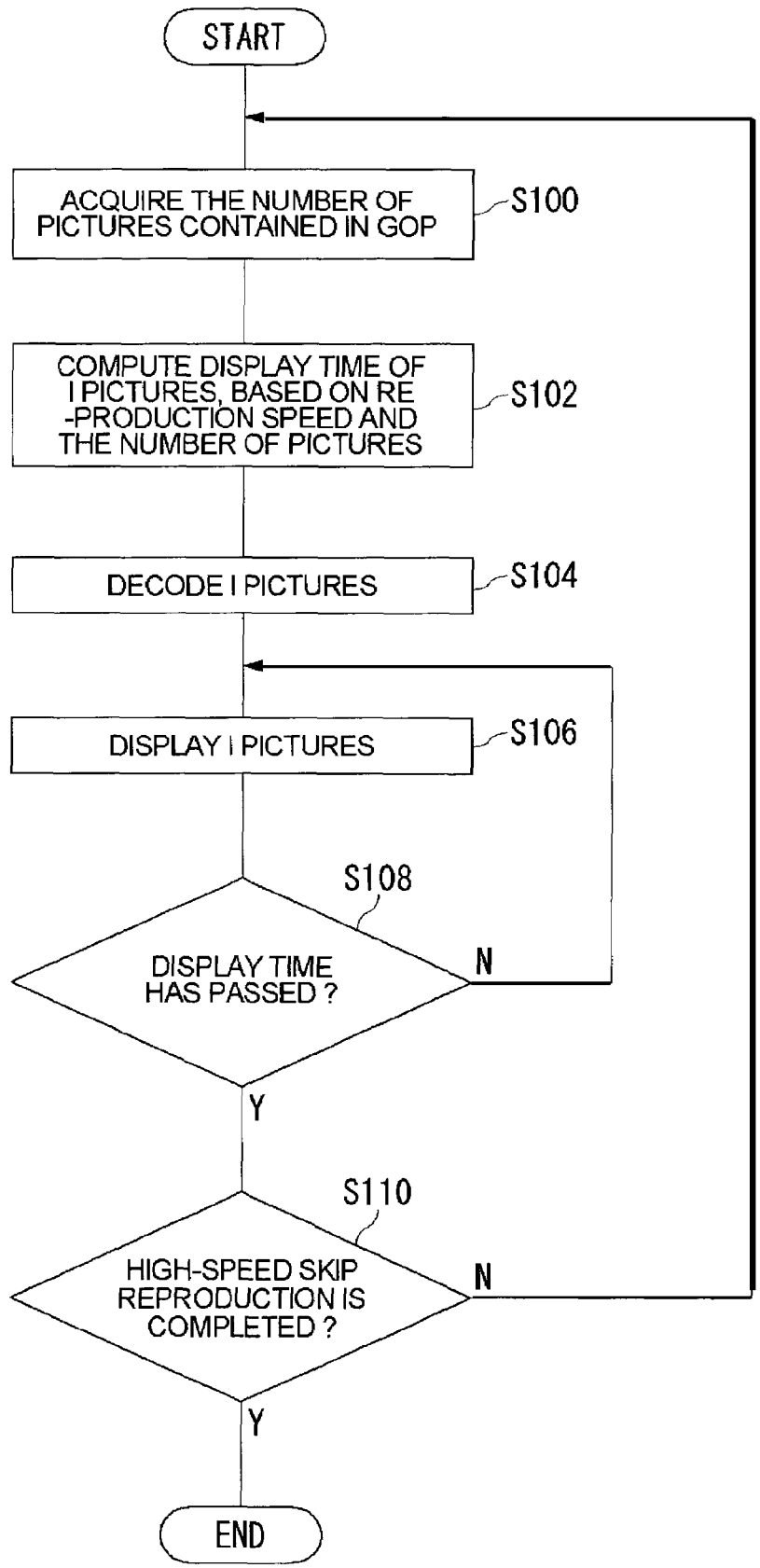
FIG. 5 is a flowchart showing a procedure for a high-speed skip reproduction by an image reproducing apparatus according to the first embodiment.

FIG. 5 shows the steps for a high-speed skip reproduction by an image reproducing apparatus 300 according to the first embodiment. First, when high-speed skip reproduction mode is turned on, the picture structure information acquiring unit 104 acquires the number of pictures contained in a GOP that is to be reproduced next (S100). When a plurality of I pictures are contained in the GOP, the number of pictures between the I pictures may be acquired. Then, based on the reproduction speed and the number of pictures, the high-speed skip reproduction control unit 114 calculates the display interval for I pictures (S102). Then, the I pictures are decoded by the MPEG decoder 130 (S104) and displayed on the display unit 344 (S106). Before the display time of the I picture elapses (N of S108), the display of the I picture continues, and when the display time has elapsed (Y of S108), the step is switched to a processing for the display of the next I picture. The procedure described above is repeated until the high-speed skip reproduction mode comes to an end (Y of S110).

Figure 6:
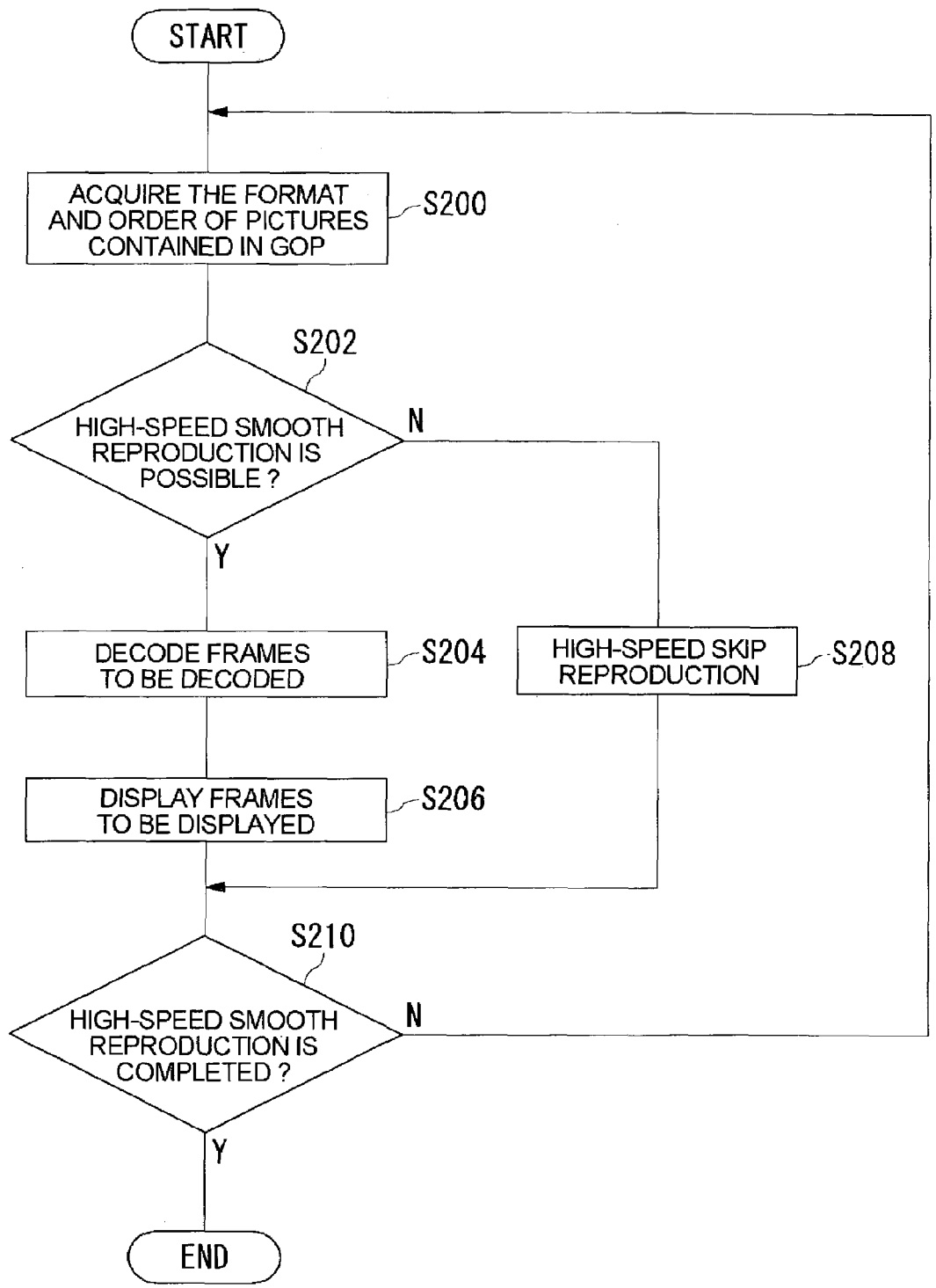
FIG. 6 is a flowchart showing a procedure for a high-speed smooth reproduction by an image reproducing apparatus according to the first embodiment.

FIG. 6 shows the steps for a high-speed smooth reproduction by an image reproducing apparatus 300 according to the first embodiment. First, when high-speed smooth reproduction mode is turned on, the picture structure information acquiring unit 104 acquires the format and order of pictures contained in a GOP that is to be reproduced next (S200). Then, the high-speed smooth reproduction control unit 116 judges whether a high-speed smooth reproduction is possible or not (S202). At this time, if the picture structure is normal or standard-like as mentioned above, it is possible to determine the validity of high-speed smooth reproduction based on the picture structure and the reproduction speed. As shown in FIG. 4, the pictures to be displayed and the pictures to be decoded may be determined, and the possibility of high-speed smooth reproduction may be judged from those structures. Once it is judged that a high-speed smooth reproduction is possible (Y of S202), the frames to be decoded are decoded by the MPEG decoder 130 (S204) and the frames to be displayed among the thus decoded frames are displayed on the display unit 344 (S206). On the other hand, once it is judged that the high-speed smooth reproduction is impossible (N of S202), the processing is switched to a high-speed skip reproduction (S208) and the I pictures only are decoded and displayed. The procedure described above is repeated until the high-speed smooth reproduction mode comes to an end (Y of S210). In the flowchart shown in FIG. 6, the possibility of high-speed smooth reproduction is judged for each GOP, but, when the picture structure is fixed or regular within a coded data sequence, one time of judgment at the change of reproduction speed is enough, and a high-speed smooth reproduction processing may be continued thereafter.

Figure 7:
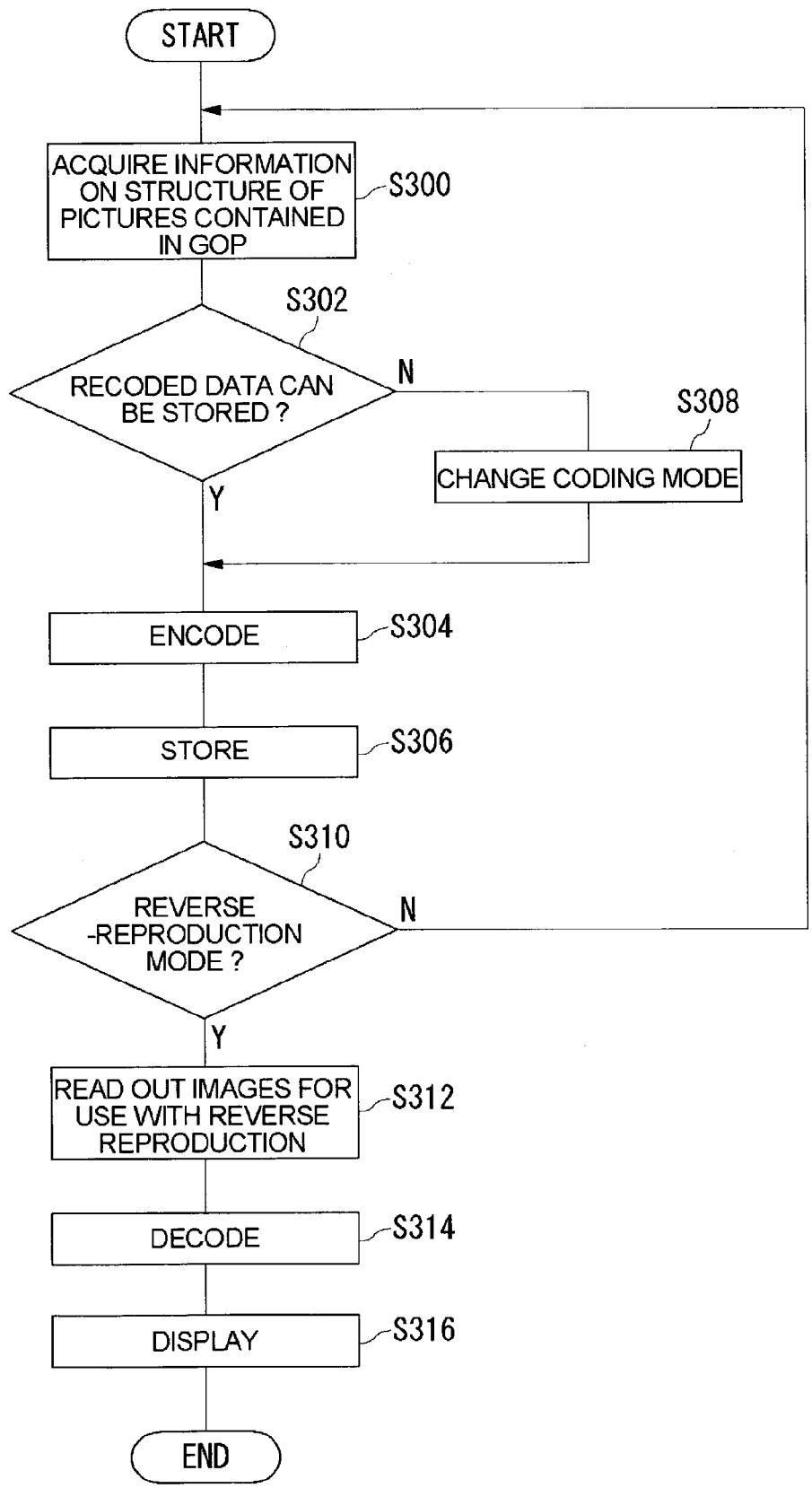
FIG. 7 is a flowchart showing a procedure for a reverse reproduction by an image reproducing apparatus according to the first embodiment.

FIG. 7 shows the steps for a reverse reproduction by the image reproducing apparatus 300 according to the first embodiment. First, in a normal reproduction mode, the picture structure information acquiring unit 104 acquires the structure information on the pictures contained in a GOP that is to be reproduced next (S300). The number, format, sequence or the like of the pictures may be acquired as the structure information on the pictures. Then, the reverse reproduction control unit 120 judges whether the recoded data of the GOP can be stored in the storage 150 or not (S302). If the data can be stored (Y of S302), the data are coded by the MPEG encoder 140 into a format that allows reverse reproduction (S304) and are stored in the storage 150 (S306). On the other hand, if the data cannot be stored (N of S302), the mode of coding is changed by thinning out the frames, raising the compression ratio or employing any other appropriate technique (S308), and then the data are coded (S304) and stored (S306) in a similar manner. The procedure described above is repeated as long as the normal reproduction mode lasts.

As the mode is switched to reverse reproduction mode (Y of S310), the reverse reproduction control unit 120 reads out for reverse reproduction one GOP of images having been stored in the storage 150 (S312), and the read-out images are then decoded by the MPEG decoder 130 (S314) and displayed on the display unit 344 (S316). During this time, the past GOP is inputted through the input block 304 and decoded in the background, and the thus generated image data are displayed in the reverse order.

Second Embodiment

Figure 8:
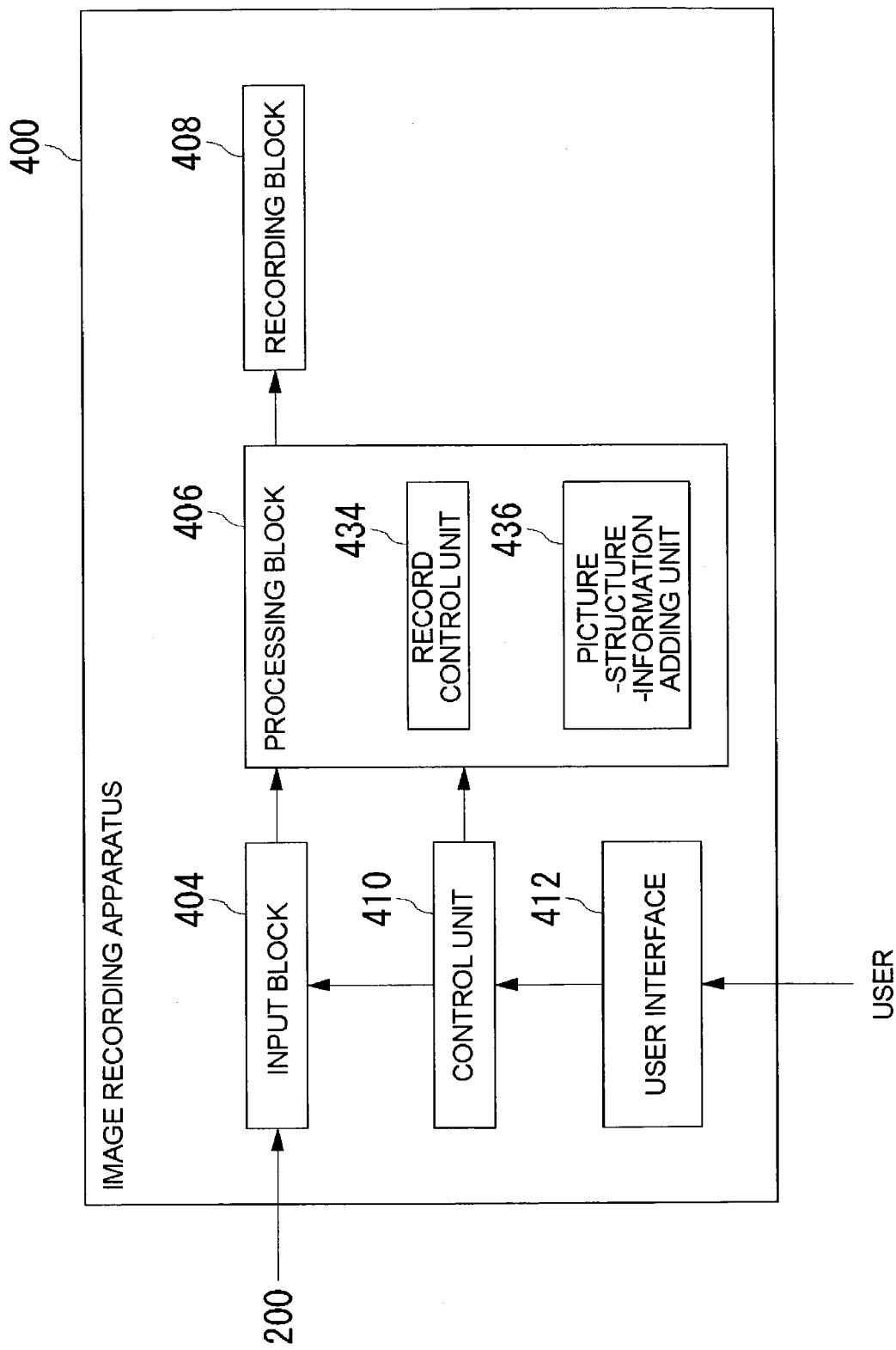
FIG. 8 is a block diagram showing a structure of an image recording apparatus according to a second embodiment of the present invention.

FIG. 8 is a block diagram showing a structure of an image recording apparatus 400 according to a second embodiment of the present invention. This image recording apparatus 400 may be incorporated into a movie camera, still camera, video CD recording apparatus, DVD recording apparatus or the like which records MPEG video streams from a transfer medium 200. The transfer media 200 include any of storage media such as video CD, CD-ROM, DVD, VTR and the like, communication media such as LAN and the like, and broadcast media such as ground wave broadcast, satellite broadcast, CATV and the like, and so forth. Moreover, when data from such a storage medium or broadcast medium are data that are not coded in compliance with the MPEG video part, the image recording apparatus 400 includes an MPEG video encoder for encoding such digital data. In a case when the image recording apparatus 400 is incorporated into the movie camera or still camera, the transfer medium 200 is replaced with an image pickup device, such as a CCD, and the signal processing circuit therefor.

The image recording apparatus 400 includes: an input block 404 which inputs a coded data sequence from the transfer medium 200; a processing block 406 which controls the recording of the coded data sequence acquired by the input block 404 to a recording block 408; the recording block 408 which records the coded data sequence; a user interface 412 which receives instructions from the user; and a control unit 410 which controls both the input block 404 and the processing block 406 based on the instructions from the user interface 412.

A recording control unit 434 in the processing block 406 records a coded data sequence to the recording block 408. A picture-structure-information adding unit 436 adds structure information, such as the number, format, sequence and the like of pictures contained in a coded data sequence, to a predetermined position, such as a user data region, for each GOP, for instance. Thereby, a data structure is generated, which includes a coded data sequence which is moving image data encoded in units of a group of frames mixedly containing first and second format frames that have different formats from each other, and information indicating the number, format or sequence of frames contained in the group of frames, which is stored in a predetermined position of the coded data sequence. The user interface 412 receives a request for recording or the like from the user via a remote controller or input panel. The control unit 410 sends a recording start signal to the input block 404 and the processing block 406. The recording control unit 434 performs a recording processing based on the recording start signal. The recording block 408 may be either a drive unit for recording in a CD, MO, MD, DVD or any other recording medium, or a recording medium itself.

In the image reproducing apparatus that reproduces the coded data sequence, adding of the picture structure information by the picture-structure-information adding unit 436 allows an appropriate control using this information. The timing for storing the picture structure information may be at the stage for recording a coded data sequence as in this second embodiment, at the stage for generating the coded data sequence by an MPEG encoder, or at any other arbitrary timing.

According to the above mentioned embodiments, a processing technique for high-speed reproduction or reverse reproduction of coded data sequences can be improved. Moreover, as a part of the improvement of the processing technique, a high-speed reproduction technique by which to give further natural impression to users, and a technique by which to reduce hardware resources required for the reverse reproduction can be provided.

The present invention has been described based on the embodiments which are only exemplary. It is understood by those skilled in the art that there exist other various modifications to the combination of each component and process described above and that such modifications are encompassed by the scope of the present invention. Such modifications will be described below.

In the present embodiments, I pictures only are reproduced in high-speed skip reproduction, but, in addition thereto, P pictures, and B pictures in some cases, may also be reproduced. In cases where the number of pictures or VOPs contained in GOPs or GOVs is large, the display of I pictures or I-VOPs only tends to become too coarse. In such a case, intermediate images may also be displayed as needed.

Although the present invention has been described by way of exemplary embodiments, it should be understood that many changes and substitutions may further be made by those skilled in the art without departing from the scope of the present invention which is defined by the appended claims.

What is claimed is:

1. An image reproducing apparatus comprising:
    an encoder which generates image data for use with reverse reproduction by coding image data corresponding to a plurality of frames in a format such that the image data can be decoded in the reverse order of a normal displaying order;
    a storage which stores temporarily the image data for use with reverse reproduction; and
    a reverse-reproduction control unit which reads out the image data for use with reverse reproduction from said storage so as to reproduce them when a reverse reproduction is requested,
    wherein the coded data sequence is coded in units of a group of frames that contain at least one first-format frame and at least one second-format frame, and wherein said reverse-reproduction control unit acquires a frame structure for the group of frames and estimates a data amount that will result from coding of the group of frames, and compares the estimated data amount with the capacity of said storage, whereby said reverse-reproduction control unit determines the mode of coding.

2. An image reproducing apparatus according to claim 1, wherein the first-format frame can be decoded by coded data of said first-format frame whereas the second-format frame can be decoded by referring to coded data of other frame.

3. An image reproducing apparatus according to claim 2, wherein, when said reverse-reproduction control unit judges that the data amount exceeds the capacity of said storage, frames in the group of frames are thinned out or a compression ratio is raised at the time of coding.

* * * * *